United States Patent
Singh et al.

(10) Patent No.: US 9,787,573 B2
(45) Date of Patent: Oct. 10, 2017

(54) FAST CONVERGENCE ON LINK FAILURE IN MULTI-HOMED ETHERNET VIRTUAL PRIVATE NETWORKS

(71) Applicant: Juniper Networks, Inc., Sunnyvale, CA (US)

(72) Inventors: Nitin Singh, Fremont, CA (US); Anshu Verma, Sunnyvale, CA (US); Sudha Madhavi Yeevani, Miranda, CA (US); Manoj Sharma, Cupertino, CA (US); Hassan C. Hosseini, San Jose, CA (US); Prasantha Kumar Gudipati, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 74 days.

(21) Appl. No.: 14/587,839

(22) Filed: Dec. 31, 2014

(65) Prior Publication Data
US 2016/0191374 A1  Jun. 30, 2016

(51) Int. Cl.
| H04L 1/00 | (2006.01) |
| H04L 12/707 | (2013.01) |
| H04L 12/703 | (2013.01) |
| H04L 12/24 | (2006.01) |
| H04L 12/46 | (2006.01) |
| H04L 12/709 | (2013.01) |

(52) U.S. Cl.
CPC .......... *H04L 45/22* (2013.01); *H04L 12/4641* (2013.01); *H04L 41/00* (2013.01); *H04L 41/0654* (2013.01); *H04L 45/24* (2013.01); *H04L 45/28* (2013.01); *H04L 45/245* (2013.01)

(58) Field of Classification Search
CPC ....................................... H04L 45/22
USPC .......................................... 370/228
See application file for complete search history.

(56) References Cited

U.S. PATENT DOCUMENTS

| 7,990,993 B1 | 8/2011 | Ghosh et al. |
| 8,780,699 B1 | 7/2014 | Hasan |
| 8,917,729 B1 | 12/2014 | Kumar et al. |
| 9,019,814 B1 | 4/2015 | Mohanty et al. |

(Continued)

OTHER PUBLICATIONS

Sajassi et al., "BGP MPLS Ethernet VPN," Network Working Group Internet Draft, draft-ietf-12vpn-evpn-11, Oct. 18, 2014, 52 pp.

(Continued)

*Primary Examiner* — Shripal Khajuria
(74) *Attorney, Agent, or Firm* — Shumaker & Sieffert, P.A.

(57) ABSTRACT

Techniques are described for providing fast convergence in the event of a link failure in an all-active multi-homed Ethernet virtual private network. A provide edge (PE) network device may pre-configure an interface next hop and secondary next hops. The secondary next hops may be logical links to other PE network devices in the same Ethernet segment. In the event of a link failure in the interface next hop between the PE network device and a customer edge (CE) network device, the PE network device may be configured to forward data traffic to the CE network device using the secondary next hops. In the event of a link failure between the PE network device and a core network, the PE network device may be configured to send an out-of-service message to the CE network device that instructs the CE network device to stop sending traffic to the PE network device.

29 Claims, 7 Drawing Sheets

(56) References Cited

U.S. PATENT DOCUMENTS

2007/0171817 A1* 7/2007 Fujita .................... H04L 45/02
 370/225
2010/0020680 A1 1/2010 Salam et al.
2010/0238795 A1 9/2010 Boutros et al.

OTHER PUBLICATIONS

Sajassi et al., "EVPN Virtual Ethernet Segment," Network Working Group Internet Draft, draft-sajassi-bess-evpn-virtual-eth-segment-00, Oct. 25, 2014, 19 pp.
Extended Search Report from counterpart European Application No. 15201673.9, dated May 25, 2016, 9 pp.
Sajassi et al, "BGP MPLS—Based Ethernet VPN," Internet Engineering Task Force, RFC 7432, IETF, Feb. 2015, 56 pp.
U.S. Appl. No. 14/841,461, filed Aug. 31, 2015, and entitled "Egress Protection for Bum Traffic With Link Failures in EVPN,".
Response to Extended Search Report dated May 24, 2016, from counterpart European Application No. 152016173.9, filed Jan. 4, 2017, 15 pp.
Kompella et al., "Multi-homing in BGP-based Virtual Private LAN Service—draft-kompella-l2vpn-vpls-multihoming-02.txt," Network Working Group, Nov. 2, 2008, 27 pp.
Li et al., "Use Cases of MPLS Global Label—draft-li-mpls-global-label-usecases-02," Network Working Group, Jul. 3, 2014, 9 pp.
Sajassi et al., "BGP MPLS-Based Ethernet VPN—draft-ietf-l2vpn-evpn-03," Network Working Group, Feb. 25, 2013, 47 pp.
Sajassi, et al., "BGP MPLS-Based Ethernet VPN," Feb. 2015, RFC 7432, https://tools.ietf.org/html/rfc7432, 56 pp.
Extended Search Report from counterpart European Application No. 15201673.9, dated Apr. 18, 2017, 6 pp.
Response filed Aug. 17, 2017 to the Communication pursuant to Article 94(3) dated Apr. 18, 2017 in corresponding EP Application No. 15201673.9, 10 pps.

* cited by examiner

FAST CONVERGENCE ON LINK FAILURE IN MULTI-HOMED ETHERNET VIRTUAL PRIVATE NETWORKS

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

As the PE network devices in an EVPN forward Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In an EVPN, MAC learning between PE network devices occurs in the control plane rather than in the data plane (as happens with traditional bridging) using a routing protocol. For example, in EVPNs, a PE network device typically use Multi-Protocol Border Gateway Protocol (MP-BGP) to advertise to other provider edge network devices the MAC addresses learned from the local consumer edge network devices to which the PE network device is connected. A PE device may use MP-BGP route advertisement with EVPN Address Family Identifiers/Subsequent Address Family Identifiers (AFI/SAFI) to announce reachability information for the for one or more MAC addresses learned by the PE network device.

In an EVPN configuration referred to as all-active mode, an Ethernet segment includes multiple PE network devices that provide multi-homed connectivity for one or more local customer network devices. In all-active mode, all PE network devices attached to the Ethernet segment are allowed to forward traffic to and from the Ethernet segment. Moreover, the multiple PE network devices may provide transport services through the intermediate network to a remote PE network device.

When a communication link between one of the multiple PE network devices and a customer network device fails, the PE network device having the failed communication link may withdraw EVPN routes corresponding to the Ethernet segment. The time needed to withdraw from the routing table may be high, especially if the PE network device had a large number of MAC addresses related to the Ethernet segment. During this transient time, any network traffic destined for the customer network device will be undeliverable by the PE network device having the failed communication, and such network traffic may be lost. Similarly, if a communication link between a multi-homed all-active PE network devices has a failed communication link between itself and a core network, any data traffic received from the customer network device destined for the core network will be undeliverable until the broken communication link is re-configured. Again, such re-configuration may take a number of seconds.

SUMMARY

The techniques described herein are directed to providing fast convergence on detection of a link failure between a remote PE network device and a core network, or detection of a link failure between a remote PE network device and a CE network device. In particular, the fast convergence techniques of this disclosure may be applied when two or more PE network devices are connected to a CE network device in a segment of a layer 2 virtual bridge. In various examples of the disclosure, a multi-homed CE network device connected to two or more PE network devices by a set of Ethernet links constitutes an "Ethernet Segment." An Ethernet segment may appear to the CE network device as a Link Aggregation Group (LAG). Ethernet segments have an identifier, called an "Ethernet Segment Identifier" (ESI).

Convergence may refer to a state of a set of routers. The set of routers may be considered to be "converged" when all routers have collected all available topology information from each other relative to a particular routing protocol. Convergence time is a measure of how fast a group of routers reaches convergence. In various examples, the techniques of this disclosure provide for faster convergence. In addition, the techniques of this disclosure may maintain data traffic delivery and maximal load balancing during a convergence time due to a link failure.

As one example, two or more PE network devices may be connected to a CE network device as an Ethernet segment of an all-active multi-homed EVPN topology. The two or more PE network devices may also be part of a link aggregation group (LAG) for the CE network device. In accordance with the techniques of this disclosure, the two or more PE network devices may pre-configure a primary route and one or more secondary routes, such that the one or more secondary routes may be used in the case of a detected link failure in the primary route. In the case that a PE network device detects a link failure between itself and a CE network device, the PE network device having the link failure may be configured to re-route traffic addressed to the CE network device via other PE network devices that are part of the same Ethernet segment (i.e., through the one or more secondary routes). In this way, convergence time is reduced because traffic can be quickly re-routed to another PE network device in the same EVPN segment en route to the CE network device. The PE network device having the link failure may be configured to withdraw MAC routes from routing tables corresponding to the Ethernet segment. During the time it takes other routers in the Ethernet segment to withdraw the PE network device having the link failure from the routing tables, using the techniques of this disclosure, the PE network device having the link failure may continue to deliver traffic to the CE network device by re-routing traffic to other PE network devices in the Ethernet segment in response to the detected link failure. The techniques of this disclosure for re-routing traffic in response to a detected link failure may be performed during the transient period between the detection of the link failure and the convergence of the network in response to withdrawing from routing tables for the Ethernet segment.

In various examples of the disclosure, such a re-route may be accomplished by pre-configuring a next hop list that defines a primary route and one or more secondary routes. The next hop list may include an interface next hop primary that specifies a route using the communication link between the PE network device and the CE network device. The next hop list may also include one or more secondary next hops that correspond to one or more secondary routes. The one or more secondary routes may include communication links between the PE network device and other PE network devices in the same Ethernet segment. Because it is known that the Ethernet segment is connected to the CE network device is an all-active multi-homed EVPN, it is known that any other PE network devices having the same Ethernet segment identifier (ESI) will also be able to connect to the CE network device. As such, it is not necessary to determine any the particular MAC addresses supported by the other PE network devices. The list next hop may be configured such that the one or more secondary routes are only used in the case that a link failure is detected on the primary route.

In another example of the disclosure, a PE network device may be configured to send a message to a CE network device in the case a link failure is detected between the PE network device and another PE network device providing access to a core network. Again, the PE network device may be one of two or more PE network devices connected to the CE network device in an all-active multi-homed EVPN topology, and may be part of a LAG.

Upon detection of a link failure between the PE network device and the PE network device providing access to the core network, the PE network device sends a message to the CE network device informing the CE network device of the link failure and instructing the CE network device to discontinue sending data traffic to the PE network device having the core network link failure. In one example of the disclosure, the message may be a link aggregation control protocol (LACP) out-of-service (OOS) message. Instead of continuing to send data traffic to the PE network devices having the core network link failure (such traffic being undeliverable), the CE network device may restrict data traffic to the other PE network devices of the LAG. The messaging techniques of this disclosure may be used in situations where there is total isolation of a PE network device to a core network. That is, the messaging techniques may not be necessary in situations where a protection mechanism, such as Juniper Networks Fast Reroute (FRR) protection mechanism, is used to maintain connectivity to the core netwok.

In one example of the disclosure a method comprises pre-configuring, at a first PE network device, a primary route to a CE network device and one or more secondary routes to the CE network device, the primary route using a first communication link between the first PE network device and the CE network device, and the one or more secondary routes using one or more other respective communication links between the first PE network device and one or more other PE network devices, wherein the first PE network device and the one or more other PE network devices are configured in an all-active mode as part of an Ethernet segment of a Layer 2 virtual bridge and the CE network device is multi-homed to the first PE network device and the one or more other PE network devices, receiving, at the first PE network device, data packets addressed to the CE network device, detecting, by the first PE network device, a link failure for the primary route, and forwarding, by the first PE network device, the data packets addressed to the CE network device using the one or more secondary routes in response to detecting the link failure for the primary route.

In another example of the disclosure a network device, wherein the network device is a first PE network device, comprises a forwarding engine configured to pre-configure a primary route to a customer edge (CE) network device and one or more secondary routes to the CE network device, the primary route using a first communication link between the first PE network device and the CE network device, and the one or more secondary routes using one or more other respective communication links between the first PE network device and one or more other PE network devices, wherein the first PE network device and the one or more other PE network devices are configured in an all-active mode as part of a segment of a Layer 2 virtual bridge and the CE network device is multi-homed to the first PE network device and the one or more other PE network devices, receive data packets addressed to the CE network device, and forward the data packets addressed to the CE network device using the one or more secondary routes in response to detecting the link failure for the primary route. The network device further comprises a routing engine configured to detect the link failure for the primary route.

In another example of the disclosure, a network system comprises a plurality of PE network devices connected to a CE network device and configured in a segment of a Layer 2 virtual bridge, wherein each of the plurality of PE network devices are configured to pre-configure a primary route to a CE network device and one or more secondary routes to the CE network device, the primary route being a first communication link between a respective one of the plurality of PE network devices and the CE network device, and the one or more secondary routes being one or more other respective communication links between the respective one of the plurality of PE network devices and others of the plurality of PE network devices, wherein the first PE network device and the one or more other PE network devices are configured in an all-active mode as part of the segment of the Layer 2 virtual bridge and the CE network device is multi-homed to the first PE network device and the one or more other PE network devices, detect a link failure for the primary route, receive data packets addressed to the CE network device, and forward the data packets addressed to the CE network device using the one or more secondary routes in response to a detection of a link failure for the primary route.

In another example of the disclosure, a method comprises detecting, by a first PE network device, a link failure between the first PE network device and another PE network device providing access to a core network, wherein the first PE network device is part of a segment of a Layer 2 virtual bridge used by a CE network device to forward data packets, and sending, by the first PE network device in response to detecting the link failure between the first PE network device and the core network, a message to the CE network device that indicates the link failure and that indicates that the data packets should not be sent to the first PE network device In another example of the disclosure, a network device, wherein the network device is a first PE network device, comprises a routing engine configured to detect a link failure between the first PE network device and another PE network device providing access to a core network, wherein the first PE network device is part of a segment of a Layer 2 virtual bridge used by a CE network device to forward data packets, and a forwarding engine configured to send, in response to the routing engine detecting the link failure between the first PE network device and the another PE network device providing access to the core network, a message to the CE device that indicates the link failure and that indicates that the data packets should not be sent to the first PE network device.

In another example of the disclosure, a network system comprises a plurality of PE network devices connected to a CE network device and a core network, wherein the plurality of PE network devices are part of a segment of a Layer 2 virtual bridge used by the CE network device to forward data packets, and wherein each of the plurality of PE network devices are configured to detect a link failure between a respective one of the plurality of PE network devices and another PE network device providing access to the core network, and send, in response detecting the link failure, a message to the CE network device that indicates the link failure and that indicates that the data packets should not be sent to the respective one of the plurality of PE network devices.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
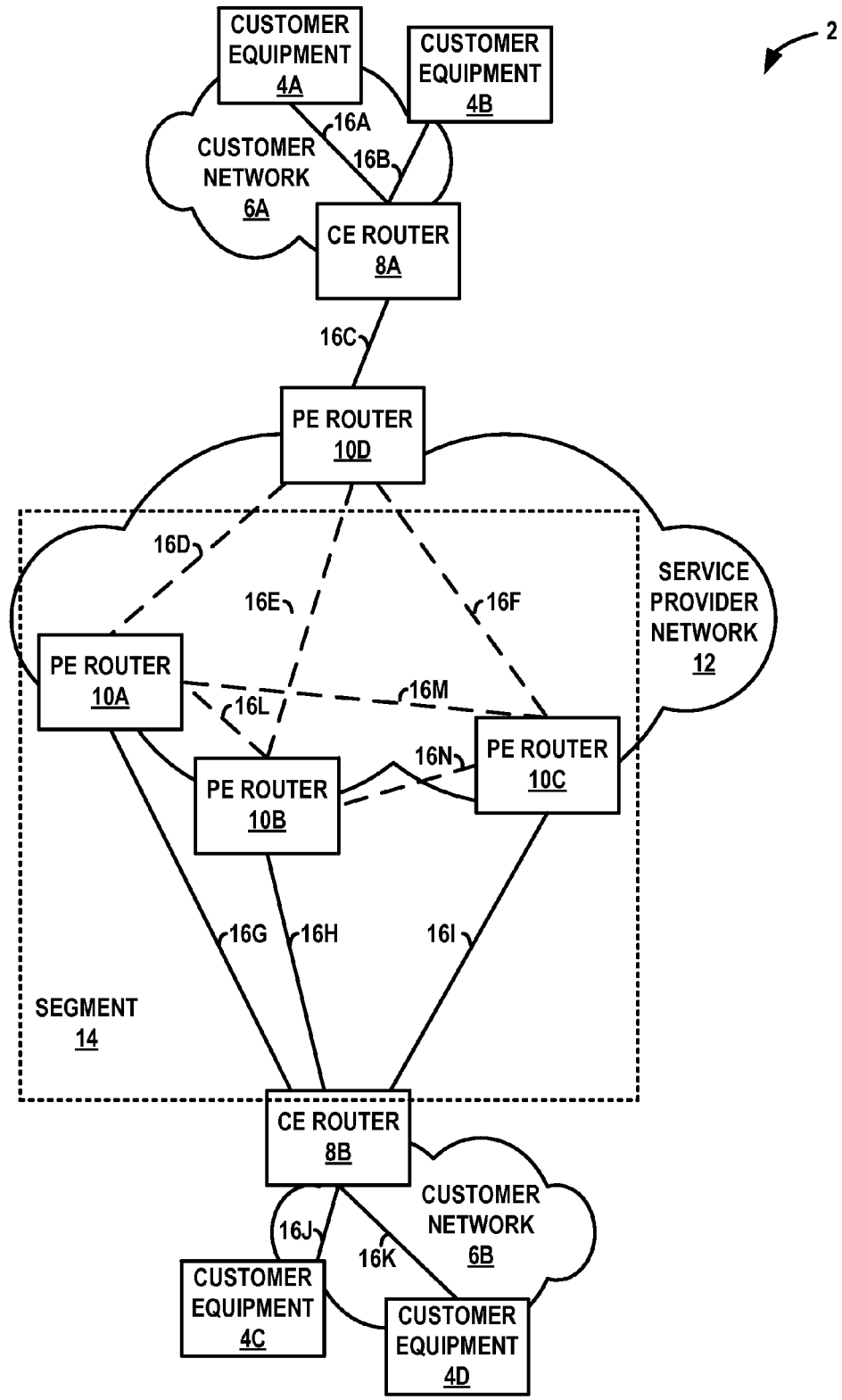
FIG. 1 is a block diagram illustrating an example system in which a first provider edge (PE) network device reroutes data traffic to other PE network devices in a segment of a Layer 2 virtual bridge in the event of a communication link failure.

FIG. 1 is a block diagram illustrating an example system in which a first provider edge (PE) network device may pre-configure its forwarding plane to forward data traffic to one or more other PE network devices in the event of communication link failure to a customer edge (CE) network device, in accordance with example techniques of this disclosure. The first PE network device may be further configured to inform a customer edge (CE) network device of a network failure in an Ethernet segment, in accordance with other example techniques of this disclosure. In the example of FIG. 1, PE routers 10A-10D ("PE routers 10") provide customer devices 4A-4D ("customer devices 4") associated with customer networks 6A-6B ("customer networks 6") with access to service provider network 12 via CE routers 8A-8B ("CE routers 8"). It should be understood that CE routers 8 are not limited to just routers, but may also be other network devices, including a Layer 2 switch. Network links 16A-16N may be Ethernet, ATM or any other suitable network connections and routes. In one example of the disclosure, each of network links 16C, 16G, 16H, and 16I are Ethernet links.

PE routers 10 and CE routers 8 are illustrated as routers in the example of FIG. 1; however, techniques of the disclosure may be implemented using switches or other suitable network devices. Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of system 2 illustrated in FIG. 1 is merely exemplary. For example, an enterprise may include any number of customer networks 6. Likewise, service provider network 12 may include any number PE routers 10. Nonetheless, for ease of description, only customer networks 6A-6B and PE routers 10A-10C are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity (e.g., a Layer 2 virtual bridge) across an intermediate network, such as service provider network 12, to interconnect two L2 customer networks, such as L2 customer networks 6, which are usually located in two different geographic areas. Often, EVPN is transparent to the customer networks in that these customer networks are not aware of the intervening intermediate service provider network and instead act and operate as if these two customer networks were directly connected. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router. Consequently, multiple EVIs may be configured for Ethernet segment 14, as further described herein, each providing a separate, logical layer two (L2) forwarding domain. In this way, multiple EVIs may be configured that each includes one or more of PE routers 10A-10C of Ethernet segment 14. When a CE device, such as CE router/Layer 2 switch 8B, is connected to two or more PE routers (e.g., PE routers 10A-C), the set of Ethernet links (e.g., 16G-I) connecting CE router/Layer 2 switch 8B to PE routers 10A-C) constitutes an Ethernet segment.

In some examples, Ethernet Tags are then used to identify a particular broadcast domain, e.g., a VLAN, in an EVI. A PE router may advertise a unique EVPN label per <ESI, Ethernet Tag> combination. An ESI (Ethernet segment identifier) is a unique nonzero identifier for an Ethernet segment. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

To configure an EVI, a full mesh of multiprotocol label switching (MPLS) label-switched-path (LSP) or generic routing encapsulation (GRE) tunnels may be configured such that each of PE routers 10 that provide EVPN for consumption by the subscribing entity is interconnected by way of MPLS LSP or GRE tunnels to every other one of the PE devices that provide EVPN for consumption by the subscribing entity. In the example of FIG. 1, each of PE routers 10 provides access to the EVPN for carrying traffic associated with customer networks 6 and, therefore, each of PE devices 10 within the same Ethernet segment may be connected to every other PE device 10 via MPLS LSP or GRE tunnels. Once MPLS LSP or GRE tunnels are configured in this manner, EVPN may be enabled within PE devices 10 to operate over the MPLS LSP or GRE tunnels, which may in this context operate as logical dedicated links through service provider network 12. In operation, EVPN generally involves prepending or otherwise inserting a tag and a VPN label onto incoming L2 packets, which may also be referred to as L2 frames (particularly in the context of Ethernet), and transmitting the tagged packets through a corresponding one of the configured MPLS LSP or GRE tunnels. Once EVPN is configured within service provider network 12, customer devices 4 within customer networks 6 may communicate with one another via EVPN as if they were directly connected L2 networks.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including media access control (MAC) addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize route advertisements of EVPN AFI/SAFI in MP-BGP to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route distinguisher, route target, layer 2 segment identifier, multiprotocol label switching (MPLS) label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10C) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 (e.g., when sending known unicast traffic) or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed (MH) when it is coupled to two physically different PE routers on the same EVI when the PE routers are resident on the same physical Ethernet Segment. As one example, CE router/Layer 2 switch 8B is coupled to PE routers 10A, 10B, 10C via links 16G, 16H, and 16I, respectively, where PE routers 10A, 10B, and 10C are capable of providing access to EVPN for L2 customer network 6B via CE router/Layer 2 switch 8B. In instances where a given customer network (such as customer network 6B) may couple to service provider network 12 via two different and, to a certain extent, redundant links, the customer network may be referred to as being "multi-homed." In this example, CE router/Layer 2 switch 8B may be multi-homed to PE routers 10A, 10B, and 10C because CE router/Layer 2 switch 8B is coupled to three different PE routers 10A, 10B, and 10C via separate and, to a certain extent, redundant links 16G, 16H, and 16I, where both of PE routers 10A, 10B, and 10C are capable of providing access to EVPN for L2 customer network 6B. Multi-homed networks are often employed by network operators so as to improve access to EVPN provided by service provider network 12 should a failure in one of links 16G, 16H, 16I occur.

As shown in FIG. 1, A CE and/or PE network device, such as CE router/Layer 2 switch 8B or PE router 10A may be multi-homed to two or more PE network devices that collectively comprise an "Ethernet segment." For instance, in the example of FIG. 1, PE routers 10A-10D are included in Ethernet segment 14. Moreover, physical links 16G, 16H and 16I of Ethernet segment 14 may appear to routing and forwarding functions within CE router/Layer 2 switch 8B as a Link Aggregation Group (LAG), i.e., a single logical link. In this way, CE router/Layer 2 switch 8B may load balance across all PE routers part of the LAG. Ethernet segments have an identifier, called the "Ethernet Segment Identifier" (ESI), which may be encoded as a ten octets integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In the example of FIG. 1, Ethernet segment 14 includes PE routers 10A-10C and CE router/Layer 2 switch 8B, and Ethernet segment 14 may be associated with a unique ESI. As described above, one or more EVIs may be configured for a single Ethernet segment. That is, multiple EVIs may be configured for Ethernet segment 14 and each respective EVI may include one or more of PE routers 10A-10C.

Using ESIs, PE routers 10 may share learned MAC addresses by sending MAC Advertisement routes that specify, among other information, a learned MAC address and a corresponding ESI. In this way, PE routers may maintain tables of MAC addresses associated with corresponding ESIs. Consequently, a PE router that receives and maintains MAC addresses that were previously learned by other PE routers can determine that a MAC route is accessible through multiple PE routers that are associated with the same ESI.

As described above, PE routers 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PE routers 10 may share NLRI to configure one or more Ethernet segments and share MAC routes that are learned by the respective devices. In general, PE routers connected to the same Ethernet segment can automatically discover each other with minimal to no configuration through the exchange of the Ethernet Segment route using BGP. In multi-homed environments EVPN defines a mechanism to signal, to remote PE routers, the need to update their forwarding tables upon the occurrence of a failure in connectivity to an Ethernet segment. This is done by having each PE router advertise an Ethernet AD Route per Ethernet segment (ES) for each locally attached segment. Upon a failure in connectivity to the attached segment, the PE router withdraws the corresponding Ethernet AD route by sending an AD route withdrawal message to other PE routers. This triggers all PE routers that receive the withdrawal to update their next-hop adjacencies for all MAC addresses associated with the Ethernet segment specified by the Ethernet AD route. If no other PE routers had advertised an Ethernet AD route for the same segment, then the PE router that received the withdrawal simply invalidates the MAC entries for that segment.

In some examples, PE routers 10A-10C may operate in "all-active mode" or "single-active mode" when forwarding network packets between PE router 10D and CE router/Layer 2 switch 8B. In all-active mode (or "active-active" mode), PE routers 10A-10C each operate concurrently to forward traffic between CE router/Layer 2 switch 8B and PE router 10D for a given EVI. In one example of all-active mode, all of PE routers 10A-10C in such a redundancy group can forward traffic to/from PE router 10D for a given EVI. By contrast, in single-active mode (or "active/standby" mode), when CE router/Layer 2 switch 8B is multi-homed to two or more PE routers, such as PE routers 10A-10C, only a single PE router in such a redundancy group forwards traffic for the CE router to/from remote PE router 10D for a given EVI.

In all-active mode, EVPN also provides configuration for "aliasing." Aliasing refers to the ability of a PE router to signal that it has reachability to a given locally attached Ethernet segment, even when it has learned no MAC addresses from that segment. An Ethernet AD route, which includes an ESI for an Ethernet segment, may be used to signal this configuration of a PE router. Remote PE routers which receive MAC advertisement routes with non-reserved ESI may consider an advertised MAC address as reachable via all PE routers which have advertised reachability to the relevant Ethernet segment. A remote PE router may generally refer to a PE router not included in an Ethernet segment and/or EVI. As one example of aliasing in all-active mode, PE router 10A may advertise an Ethernet AD route to PE router 10D. Using aliasing, PE router 10D would, in response to receiving the Ethernet AD route, forward traffic to PE routers 10B-10C as well as PE router 10A because PE routers 10B-10C are in the same EVI of Ethernet segment 14.

In EVPN networks, data plane learning happens on the access side and multi-homed PEs (e.g., PE routers 10A) update MAC and MAC+IP routes in a BGP control plane to peer MH PEs (e.g., PE routers 10B-10C) and remote PEs (e.g., PE router 10D). An ESI is used for identifying Ethernet segments for MAC learning. Each of PE routers 10A-10C may be configured to advertise an AD-per-ES route. Upon detection of a link failure (e.g., a failure of one of network links 16G-16I), to overcome issue of massive MAC withdrawals, PE routers 10A-10C may be configured to withdraw from routing tables for Ethernet segment 14 by sending an AD-per-ES (Ethernet segment) withdrawal. The AD-per-ES withdrawal indicates connectivity failure to Ethernet segment 14, rather than signaling the failure on per-MAC basis. After receiving AD-per-ES Mac withdrawal message, any remote PEs (e.g., PE routers 10B-10D) update their respective forwarding state by flushing all MACs from the failed Ethernet segment.

In an EVPN A/A MH scenario, such as shown in FIG. 1, all of PE routers 10A-10C are capable of forwarding traffic to CE router/Layer 2 switch 8B in all-active mode. CE router/Layer 2 switch 8B may take advantage of LAG and load balance traffic in Ethernet segment, so each of PE routers 10A-10C may receive some traffic from CE router/Layer 2 switch 8B and forward it using MPLS label-switch-path (LSP)/generic routing encapsulation (GRE) tunnels in the core (e.g., through PE router 10D) to destination CEs (e.g., CE router/Layer 2 switch 8A).

If one of network links 16G-16I fails between CE router/Layer 2 switch 8B and one of PE routers 10A-10C on the access side, or if one of network links 16D-16F fails between one of PE routers 10A-10C and the core network (e.g., PE router 10D), then the MH PE (e.g., one of PE routers 10A-10C) having the failed communication link black holes traffic (i.e., discards traffic) received traffic the remote CE (e.g., CE router/Layer 2 switch 8A) or the access side (e.g., CE router/Layer 2 switch 8B), respectively. For access link failure between CE router/Layer 2 switch 8B and one of PE routers 10A-10C (i.e., failure of one of network links 16G-16I), packets received from the core network (e.g., through PE router 10D) are dropped on the MH PE having the failed network link until the global repair process completes. Convergence and restoration times on network events such as link flaps are in order or more than one second (bounded by propagation delays of BGP updates). As such, a considerable amount of known unicast data traffic may be lost during this time.

In view of the foregoing drawbacks, this disclosure proposes data forwarding and messaging techniques that lead to faster convergence and less data loss upon network link failure, while still preserving load balancing, in an all-active multi-homed EVPN.

In one example of the disclosure, MH PE routers (e.g., PE routers 10A-10C) may be configured to re-route traffic to CE router/Layer 2 switch 8B, using a next hop list, through other respective ME routers in Ethernet segment 14 in response to a detection of a link failure in one of network links 16G-16I. The techniques of this example will be described with reference to PE router 10A, though it should be understood that the techniques of this example may be used by each MH PE router in Ethernet segment 14 (i.e., each of PE routers 10A-10C).

Figure 5:
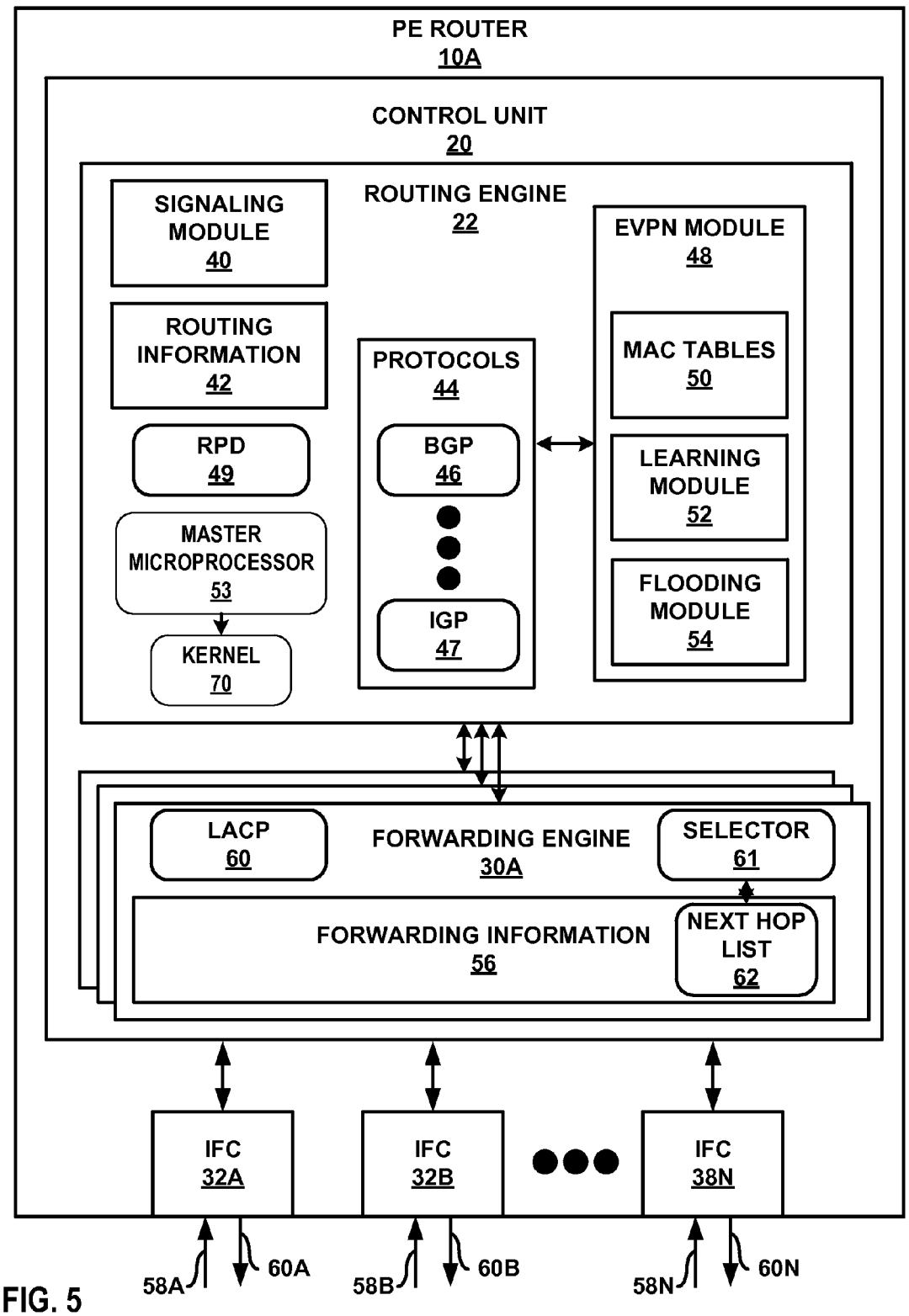
FIG. 5 is a block diagram illustrating further details of an example PE router, in accordance with techniques of the disclosure.

A next hop list, as will be further described in FIG. 5, for example, may specify an one or more indirect routes to destination computing devices and one or more direct routes to the destination computing devices that share a common subnetwork. The next hop list may specify an active element that causes a forwarding engine of a PE network device to send network traffic destined to the destination computing devices using the indirect route(s) or the direct route(s). For example, if the active element is set to the direct route structure, PE router 10A sends network traffic destined to the destination computing devices (e.g., CE router/Layer 2 switch 8B) using the direct route (e.g., 16G). If the active element is later changed to the indirect route, PE router 10A sends the network traffic destined to the computing devices using the indirect route specified by the next hop list (e.g., using network links 16L and 16M through PE router 10B and PE router 10C, respectively).

In one example of the disclosure, PE routers 10A-10C are part of Ethernet segment 14 configured as an all-active multi-homed EVPN. The techniques of this disclosure may be applicable for use with any type of data traffic. However, the techniques of this disclosure may be particularly beneficial for use with known unicast traffic, which may be sent through Ethernet segment 14 using a single path (e.g., as opposed to BUM traffic in which redundant copies of data may be sent to each of PE routers 10A-10C in Ethernet segment 14). PE router 10 may pre-configure a next hop list such that data traffic addressed to CE router/Layer 2 switch 8B will be routed over a primary route (e.g., over network link 16G) as long as the primary route is available. The primary route may be a data plane learned MH PE MAC route that points to a local logical interface (ifl). In the case of PE router 10A, the ifl may be network link 16G. PE router 10A may pre-configure the next hop list with the ifl (network link 16G) as the primary route (i.e., the primary next hop). That is, as long as network link 16G is available, PE router 10A will be configured to forward data addressed to CE router/Layer 2 switch 8B (or any data addressed to any MAC addresses that are served by CE router/Layer 2 switch 8B) using network link 16G.

PE router 10A may further pre-configure the next hop list with one or more secondary routes (i.e., one or more secondary next hops). The secondary routes may be configured as MPLS next hops or indirect next hops (INHs) in the next hop list. In particular, PE router 10A may configure the secondary routes as data plane learned logical routes to any other PE routers in the same Ethernet segment as PE router 10A (e.g., PE router 10B and PE router 10C). The next hop list may be pre-configured such that the secondary routes are indirect next hops (INH) that are only used in the case of a link failure in the local ifl (i.e., link 16G in the example of PE router 10A).

Figure 2:
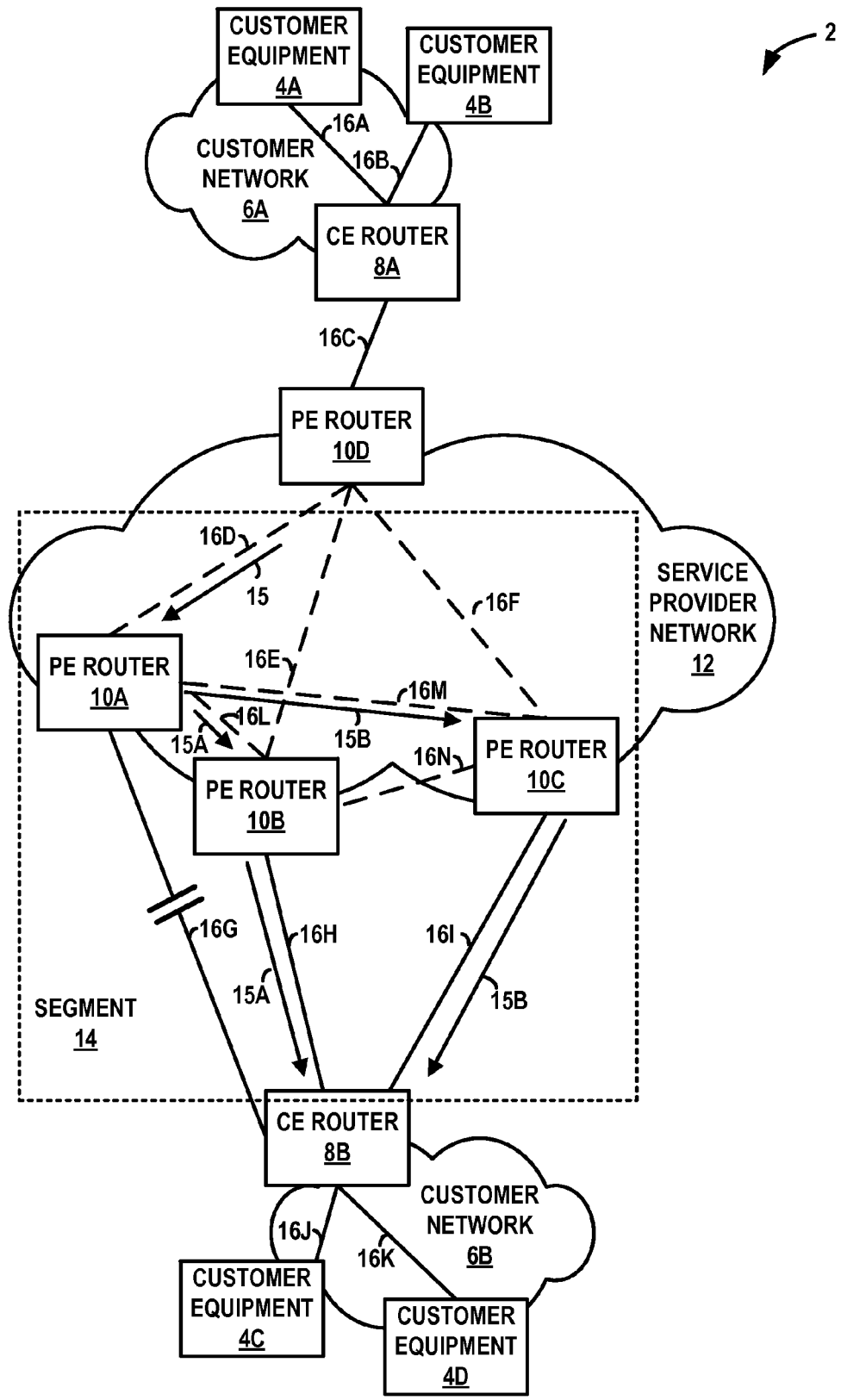
FIG. 2 is a block diagram illustrating an example system in which a first PE network device reroutes data traffic to other PE network devices in the event of a link failure to a customer edge (CE) network device.

In the example of FIG. 1, PE Router 10B and PE router 10C are in the same Ethernet segment 14 as PE router 10A. As such, the secondary route indicated/specified by the INH of the next hop list for PE router 10B would include logical network links 16L and 16M. As shown in FIG. 2, in the case of a link failure detected in network link 16G (i.e., between MH PE router 10A and CE router/Layer 2 switch 8B), rather than demoting the network to use only a single leg of the all-active MH EVPN, data traffic 15 destined to the CE router/Layer 2 switch 8B through PE router 10A can follow the secondary route indicated/specified by the INH to the other MH PEs and from there to the CE. As shown in FIG. 2, data traffic 15 may be forwarded as data traffic 15A and data traffic 15B to PE router 10B and PE router 10C, respectively, in the case of a detected link failure in network link 16G. That is, the INH may be configured such that the data traffic that is re-routed to other MH PEs is load-balanced across the other MH PEs.

PE router 10A may pre-configure the INHs with secondary routes that use all MH PE routers in Ethernet segment 14 that are capable of routing data to an MAC addresses sitting behind Ethernet segment 14 (e.g., any MAC addresses served by CE router/Layer 2 switch 8B). The secondary routes may be determined based on the ESI of each of the routers. If an MH PE router has the same ESI as PE router 10A, the route to such a router may be used as a secondary route in the INH. The above-described local repair mechanism on PE router 10A ensures reachability to CE router/Layer 2 switch 8B and facilitates traffic to remain load-balanced in Ethernet segment. It should be understood that PE router 10A may still perform an AD-per-ES withdrawal from any routing tables in Ethernet segment 14 upon detection of a link failure. In this case, the above-described techniques of re-routing data using the pre-configured next hop list may only take place during the transient period of segment convergence (i.e., until the AD-per-ES withdrawal has removed the MH PE with the link failure from all routing tables). Additional detail regarding the implementation of data re-routing using a next hop list will be described below with reference to FIG. 4 and FIG. 5.

In another example of disclosure, PE router 10A may be configured to perform techniques that provide for fast convergence on core isolation. In particular, this disclosure proposes techniques whereby PE router 10A may be configured to detect a link failure between PE router 10A and another PE network device providing access to a core network (e.g., a failure in network link 16D, i.e., core isolation). As explained above, PE router 10A may be part of a LAG with PE router 10B and PE router 10C for CE router/Layer 2 switch 8B. The LAG allows CE router/Layer 2 switch 8B to treat network links 16G-16I as one logical links, thus causing network traffic emanating from CE router/Layer 2 switch 8B to load balanced across Ethernet segment 14. However, if network link 16D is unavailable (e.g., due to a change in routing protocol settings or from any other type of tunnel failure), PE router 10A will not be able to forward any data received from CE router/Layer 2 switch 8B to the core network through PE router 10D.

Figure 3:
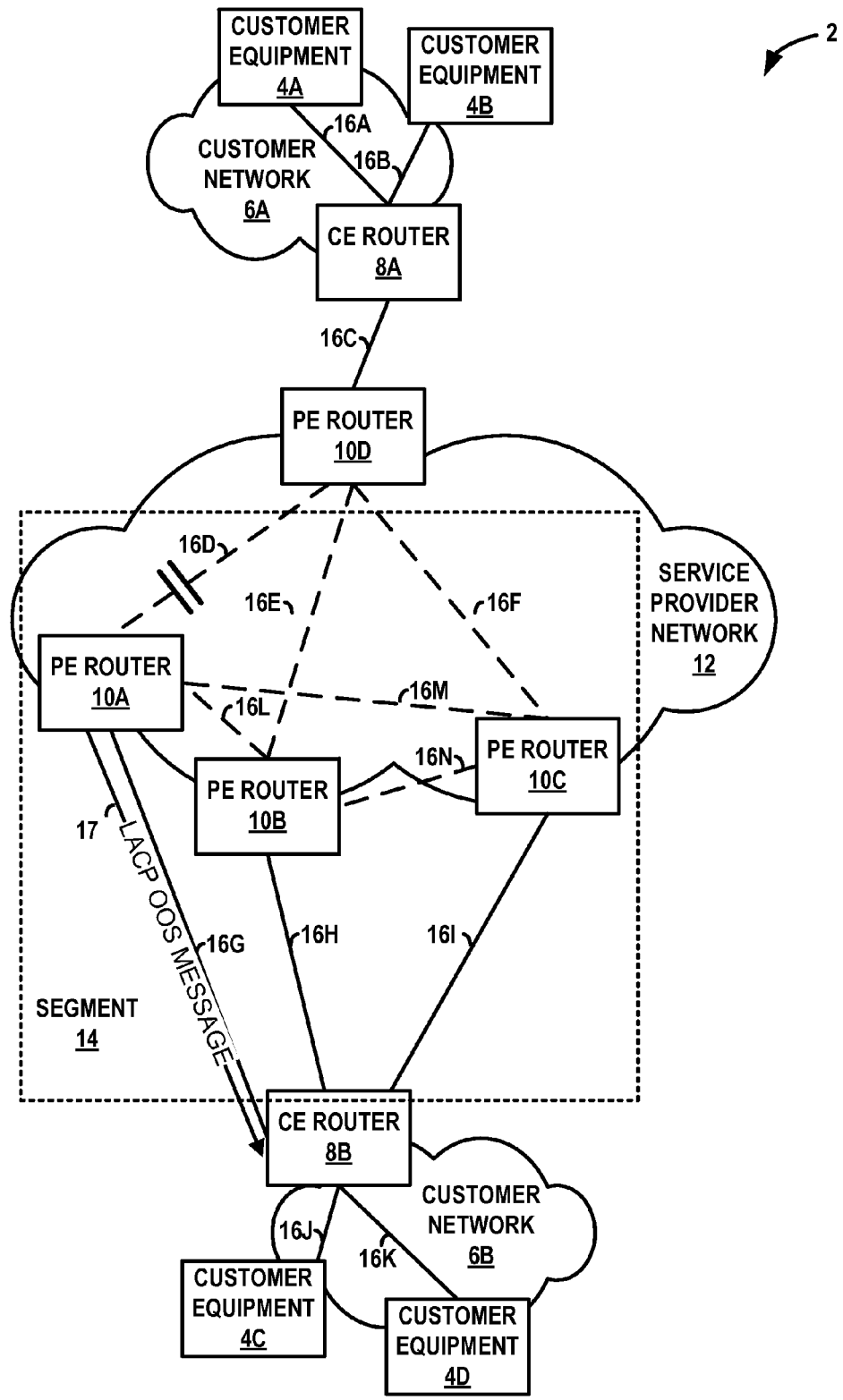
FIG. 3 is a block diagram illustrating an example system in which a first PE network device sends an out-of-service message to a CE network device in the event of a link failure to a core network.

To avoid this situation, in accordance with examples of this disclosure, PE router 10A may be configured to send a message to CE router/Layer 2 switch 8B in response to detecting a link failure to a core network (e.g., if network link 16D has failed). This message may inform CE router/Layer 2 switch 8B of the link failure and instruct CE router/Layer 2 switch 8B to no longer send data to PE router 10A. For example, as shown in FIG. 3, if a link failure is detected in network link 16D, PE router 10A may be configured to send a LACP OOS message 17 to CE router/Layer 2 switch 8B. In response, CE router/Layer 2 switch 8B may remove PE router 10A from the lag. Instead, CE router/Layer 2 switch 8B may divert traffic to other working MH PEs of Ethernet segment 14 (e.g., PE router 10B and PE router 10C), thus avoiding a substantial amount of traffic loss. Additional detail regarding the implementation of LACP OOS messaging will be described below with reference to FIG. 4 and FIG. 5.

Figure 4:
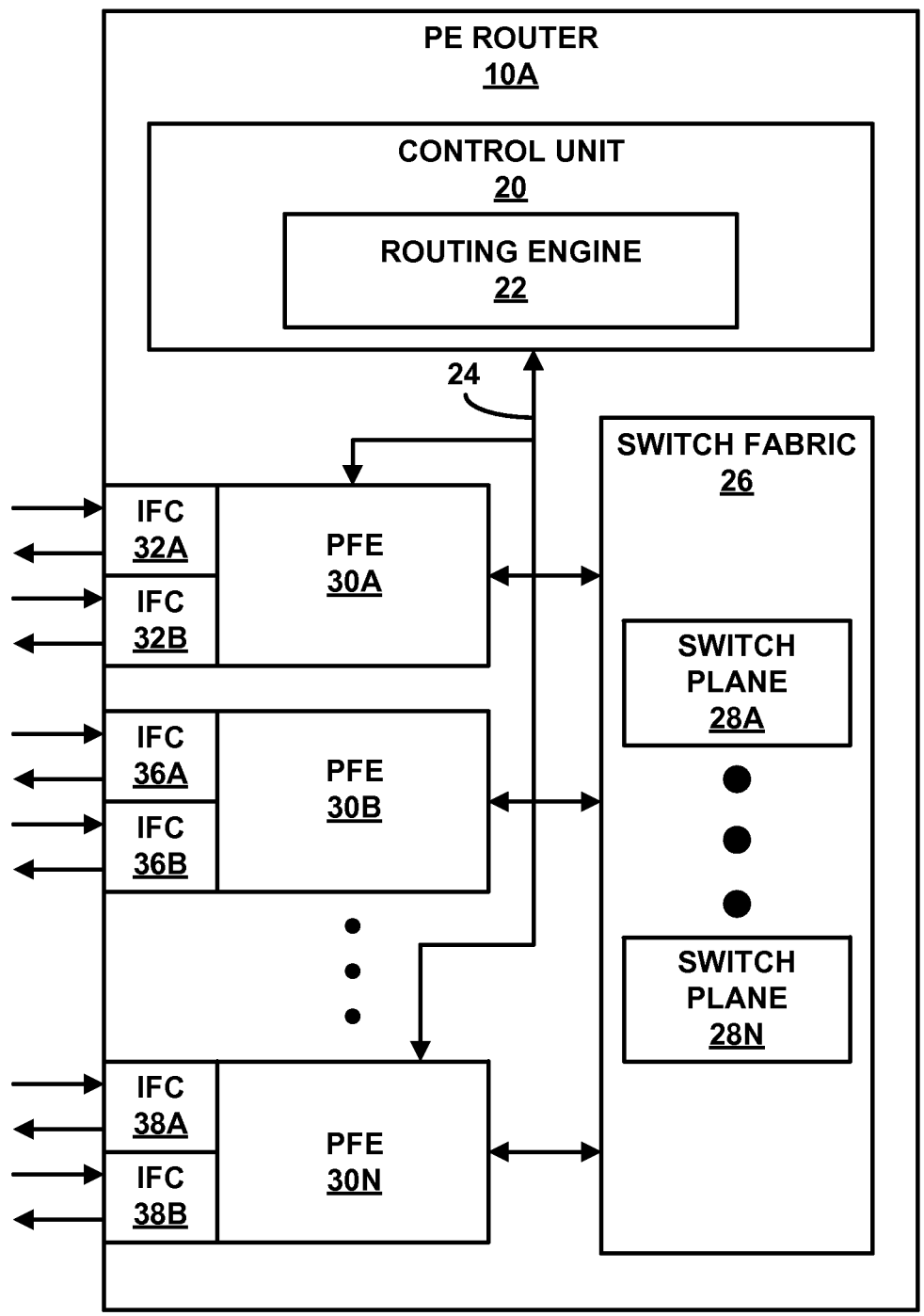
FIG. 4 is a block diagram illustrating an example PE router of FIG. 1 in greater detail, in accordance with techniques of the disclosure.

FIG. 4 is a block diagram illustrating example PE router 10A of FIG. 1 in greater detail, in accordance with techniques of the disclosure. PE routers 10B and 10C (or any other MH PE router in the same Ethernet segment) may be configured in the same way as PE router 10A. PE router 10A includes control unit 20, switch fabric 26, and packet forwarding engines (PFEs) 30A-30N ("PFEs 30"), capable of implementing techniques of the disclosure. PFEs 30 may receive and send data (e.g., data packets) via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to PE router 10C. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 may be configured to detect any link failures including an access-side link failure (e.g., a failure in network link 16G), and an core-side link failure (e.g., a failure in link 16D) in accordance with the techniques of this disclosure. Routing engine 22 copies the FIB to each of PFEs 30. This allows the FIB in each of PFEs 30 to be updated without degrading packet forwarding performance of PE router 10A. Alternatively, routing engine 22 may derive separate FIBs which are copied to respective PFEs 30. Routing engine 22 may also be configured to inform PFEs 30 of network failures and update PFEs 30 in accordance with the techniques of this disclosure, and will be discussed in more detail below with reference to FIG. 5.

Control unit 20 provides an environment for storing L2 network topology information, e.g., spanning tree information, executing connectivity fault management (CFM) protocols to provide fault isolation and detection over large L2 networks, and providing a management interface to allow user access and configuration of PE router 10A. The operating environment of control unit 20 may be implemented solely in software, or hardware, or may be implemented as a combination of software, hardware or firmware. For example, control unit 20 may include one or more processors which execute software instructions. In that case, control unit 20 may include various software modules or daemons, and may include a computer-readable storage medium, such as computer memory or hard disk, for storing executable instructions.

In a routing node, a "switch plane" is generally capable of providing a communication path between any two of PFEs 30. In this example, switch fabric 26 consists of multiple standalone switch planes 28A through 28N ("switch planes 28"). In some examples, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of PE router 10A is not diminished. The back-up switch plane(s) may be identical to the active switch planes and act as hot spare(s) to maintain bandwidth capacity in the event that one or more of the active switch planes fail. Each of switch planes 28 is operationally independent; therefore, PE router 10A may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within PE router 10A. In this manner, switch planes 28 form a standalone switch fabric that enables packet forwarding between the plurality of PFEs 30 of PE router 10A. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be an egress PFE. Consequently, egress PFE 30 may route network packets to other network devices via one or more of network interfaces 38A-38B.

In accordance with techniques of the disclosure, PE routers 10A may pre-configure a next hop list in PFEs 30 with a primary route and one or more secondary routes. The primary route is a first communication link (e.g., network link 16) between PE router 10A and CE router/Layer 2 switch 8B. The one or more secondary routes may be one or more other respective communication links (e.g., network link 16L and network link 16M) between PE router 10 and other MH PE routers of the same segment (e.g., PE router 10B and PE router 10C). PE router 10A may detect, using routing engine 22 a link failure in the primary route (i.e., in network link 16G). PFEs 30 may receive data packets addressed to the CE router/Layer 2 switch 8B, and forward the data packets addressed to the CE router/Layer 2 switch 8B to the one or more secondary routes in response to a detection of a link failure in the primary route.

In another example of the disclosure, PE router 10A, using routing engine 22, may detect a link failure between PE router 10A and another PE network device providing access to a core network (e.g., a link failure in network link 16). Routing engine 22 may inform PFEs 30 of the link failure. PFEs 30 may be configured to send, in response detecting the link failure between PE router 10 and the core network, a message to the CE router 10B that indicates the link failure and that indicates that data packets should not be sent to PE router 10A.

FIG. 5 is a block diagram illustrating further details of a PE router (e.g., PE router 10A) that is configured to route data traffic and message CE router in the event of a link failure, in accordance with techniques of the disclosure. PE router 10A includes a control unit 20 that includes a routing engine 22 coupled to a forwarding engine 30A-30N ("forwarding engines 30"). PE router 10A includes interface cards 32A-38N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In this respect, routing engine 22 represents hardware or a combination of hardware and software that implements routing protocols 44 with routing protocol daemon 49 ("RPD 49"). RPD 62 may generate routing information 42 and update forwarding engines 30A-30AN with the routing information.

In the example of FIG. 5, protocols 44 may include the Border Gateway Protocol (BGP) 46 and Interior Gateway Protocol (IGP) 47, which are routing protocols. Routing engine 22 may include other protocols not shown in FIG. 5. BGP 46 and/or IGP 47 may be used to maintain routing information 42 in the form of a routing information base (RIB) that describes a topology of a network, and derives a forwarding information base (FIB) in accordance with the routing information. In general, the routing information represents the overall topology of the network. IGP 47 interacts with kernel 70 (e.g., by way of API calls) executing on master microprocessor 53 to update the RIB based on routing protocol messages received PE router 10A. The RIB may include information defining a topology of a network, including one or more routing tables and/or link-state databases.

Kernel 70 executes on master microprocessor 52 and may comprise, for example, a UNIX operating system derivative such as Linux or Berkeley Software Distribution (BSD). Kernel 70 processes kernel calls from BGP 46 and IPG 47, to generate forwarding information 56 based on the determined network topology, i.e., performs route resolution and path selection. In some examples, kernel 70 generates forwarding information 56 in the form of radix or other lookup trees to map packet information (e.g., header information having destination information and/or a label stack) to next hops and ultimately to interface ports of interface cards associated with respective PFEs 30.

Master microprocessor 53 executing kernel 70 programs PFEs 30 to install copies of the forwarding information 56. Microprocessor 53 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Control unit 42 also includes an EVPN module 48 having flooding module 54 that performs flooding and a learning module 52 that performs layer two (L2) learning, e.g., learning of customer device MAC addresses from inbound PWs and association of those customer MAC addresses with corresponding outbound PWs and output interfaces. EVPN module 48 may maintain MAC tables 50 for each EVI established by PE router 10C, or in alternative examples may maintain one or more MAC tables that are independent of each respective EVI. Learning module 52 and flooding module 54 may alternatively reside within forwarding engines 30.

Signaling module 40 outputs control-plane messages to automatically establish Multi-Point-to-Point Tunnel for EVPN, Ethernet Segments, and otherwise provision one or more EVPNs between PE router 10C and each of the other PE routers 10. Signaling module 40 may signal the PE routers 10 using one or more suitable L3 protocols, such as the BGP. Signaling module 40 can communicate with forwarding engine 30A to automatically update forwarding information 56.

As described above, routing engine 22 is responsible for the maintenance of routing information 42 to reflect the current topology of a network and other network entities to which PE router 10A is connected. In particular, routing protocols periodically update routing information 42 to accurately reflect the topology of the network and other entities based on routing protocol messages received by PE router 10A. RPD 49 interacting with protocols 44 and API calls to kernel 70 may be configured to detect both access-side link failures (e.g., a failure in network link 16G in FIG. 2) and core-side link failures (e.g., a failure in network link 16D in FIG. 3). Routing engine 22 may be configured to inform forwarding engines 30 of an access-side failure and cause updates to next hop list 62 and selection of routes within next hop list 62 by forwarding engines 30. In addition, RPD 49, using Kernel 70, may be configured to inform a LACP engine 60 in forwarding engines 30 of a core-side link failure. As will be explained in more detail below, detection of network topology and link failures by routing engine 22 may trigger components of forwarding engine 30 to perform the data forwarding and messaging techniques of this disclosure.

EVPN module 48 executes in the control plane of PE router 10A and performs MAC address learning to automatically update portions of forwarding information 56 for each EVI established by PE router 10A. EVPN module 48 is invoked when PE router 10A receives data packets on the pseudowires (PWs) established by router PE router 10A for any of the PE routers 10 that are members of an EVI. EVPN module 48 performs MAC address learning using learning module 52 and updates the one of MAC tables 50 to initially record associations between the PWs connected to PE router 10A and the source MAC addresses of the EVPN customer devices from which the data packets were received on the PWs. For example, the one of MAC tables 50 records PW numbers that identify the PWs connected to PE router 10A, and records MAC addresses that identify the source customer devices of the data packets transmitted over the PWs. In effect, router PE router 10A, an L3 routing device (or in some examples, an L2 switching device), learns associations between MAC addresses and pseudowires (which are mapped to ports), much as an L2 switch learns associations between MAC addresses and ports. Forwarding information 56 may represent a virtual port binding and bridging table.

Forwarding engines 30A-30N represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE router 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 5, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures. In accordance with the techniques of this disclosure forwarding information 56 may include a next hop list 62. Next hop list 62 may include next hops for a primary route and one or more secondary routes.

In addition, the control logic within each of forwarding engines 30 may program entries in the hardware FIB so as to associate each entry with one of a plurality of selector block 61. Selector 61 includes circuitry configured to reflect the status of the physical link and/or interface port to which a network route is assigned. For example, selector 61 may be written by a selection software module executing on a microprocessor within forwarding engines 30 that detects the state of the link (e.g., as indicated by routing engine 22) and writes a corresponding value selector 61. Selector 61 provides an output value that indicates to control logic on a line card which physical interface port to use when forwarding packets to either an interface port associated with a direct route or an interface port associated with an indirect route. Upon detecting a link failure, the control logic of forwarding engines 30 reprograms selector 61 to reflect the status change, i.e., that the corresponding physical link has failed. Forwarding engines 30, upon detecting the link failure for a primary route, may automatically update a next hop list (e.g., next hop list 62) used to resolve the direct route such that forwarding engines 30 uses an indirect route specified by a next hop list to route network traffic, as will be explained in more detail below.

With reference to forwarding data to CE router/Layer 2 switch 8B, a primary next hop for PE router 10A may specify an interface of interfaces 32 that is coupled to network link 16G. Accordingly, in accordance with the data plane learned network topology stored as routing information 42, forwarding engines 30 may pre-configure next hop list 62 to specify a primary route in a primary next hop (also called interface next hop) that forwards information to the local ifl (i.e., the logical interface to the MH CE router). In the example of FIG. 1, the ifl for PE router 10A is network link 16G to CE router/Layer 2 switch 8B.

Forwarding engines 30 may further use routing information 42 to pre-configure next hop list 62 with one or more secondary routes. The one or more secondary routes may be defined in indirect next hops (INH), or more generally, MPLS next hops, representing forwarding routes to one or more other MH PEs in the same network segment as PE router 10A. With reference to forwarding data to CE router/Layer 2 switch 8B, an indirect connection (or INH) for PE router 10A would be available through the other MH PE routers in Ethernet segment 14 (i.e., through PE router 10B and PE router 10C using network links 16L and 16M, respectively). As such, forwarding engines 30 may pre-configure next hop list 62 to include network links 16M and 16L as the secondary routes. Routing engine 22 may identify the secondary routes (i.e., the INHs) using the ESI of other PE routers. Any MH PE router having the same ESI as PE router 10A (e.g., as indicated in routing information 42) may be used as an INH for forwarding data to CE router/Layer 2 switch 8B.

Forwarding engines 30 may pre-configure next hop list 62 such that data destined for a ME CE network device (e.g., CE router/Layer 2 switch 8B) is forwarded using the primary next hop (i.e., specifying the local ifl) as long as the primary route (e.g., network link 16G) is available. This may be accomplished by pre-configuring the primary hop of next hop list 62 with a relatively low weight/route preference and pre-configuring the INHs of next hop list 62 with relatively high weights/route preference. The weight/route preference of a next hop determines which of the multiple next hops will be used. Forwarding engines 30 will use the next hop having the lowest weight/route preference available. Since it is preferable to use the local ifl (i.e., the primary route) to CE router/Layer 2 switch 8B in order to maintain load balancing across the all-active multi-homed EVPN, the primary route is given the lowest weight/route preference. The INHs will only be used upon detection of a link failure in the primary route. Again, forwarding engines 30 may be informed of a link failure by routing engine 32.

In the event of link failure of the local ifl, it is still preferable to maintain load-balancing across the all-active MH EVPN. As such, forwarding engine 30 may, in one example, pre-configure each INH in next hop list 62 to have the same weight/route-preference. Forwarding engines 30 may be configured to load-balance all traffic when multiple next hops have the same weight/route preference. In other examples, forwarding engines 30 may be configured to assign the INHs different weights to affect any forwarding scheme desired.

In the event that routing engine 22 detects a link failure in the local ifl (e.g., link 16G of FIG. 1), routing engine 22 may inform forwarding engines 30 of such a failure. In response forwarding engines 30 may access next hop list 62 in forwarding information 56. Since the link 16G is no longer available, forwarding engines 30 update the next hop list to select the one or more secondary routes (i.e., the INHs) and re-route any traffic received for the MH CE network device (e.g., CE router/Layer 2 switch 8B) through the INHs. In the example of FIG. 1, the INHs may be network links 16L and 16M through PE router 10B and PE router 10C, respectively.

In another example of the disclosure, RPD 62 of routing engine 22 may determine that a link failure has occurred between PE router 10A and a core network (e.g., a link failure in network link 16D of FIG. 1). RPD 62 may inform forwarding engines 30 of such a link failure. For example, RPD 62 may inform LACP 60 executing on forwarding engines 30 of such a link failure through AP I calls to kernel 70. LACP 60 is a protocol that controls the bundling of several physical connections together. For example, as shown in FIG. 1, network links 16G-16I may form a LAG for CE router/Layer 2 switch 8B. LACP 60 may be used to control the function of the LAG and to negotiate services with other devices operating LACP.

In the example of FIG. 1, each of CE router/Layer 2 switch 8B and MH PE routers 10A-10C would operate according to LACP.

In accordance with one example of the disclosure, RPD 62 may inform LACP 60 of a core-side link failure. In response, LACP 60 may be configured to send an OOS message to CE router/Layer 2 switch 8B. In effect, the OOS message informs the CE router/Layer 2 switch 8B that the PE router 10A is experiencing a core-side network failure. In addition, the OOS message may instruct or otherwise cause the CE router/Layer 2 switch 8B to stop sending data traffic to PE router 10A, since PE router 10A is unable to deliver any traffic to the core network, and ultimately to customer network 6A. CE router/Layer 2 switch 8B may also be configured to remove PE router 10A from the lag and only send data through PE routers 10B and 10C.

Elements of PE router 10A may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of PE router 10A may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10A, e.g., protocols. PE router 10A, in some examples, retrieves and executes the instructions from memory for these aspects.

Figure 6:
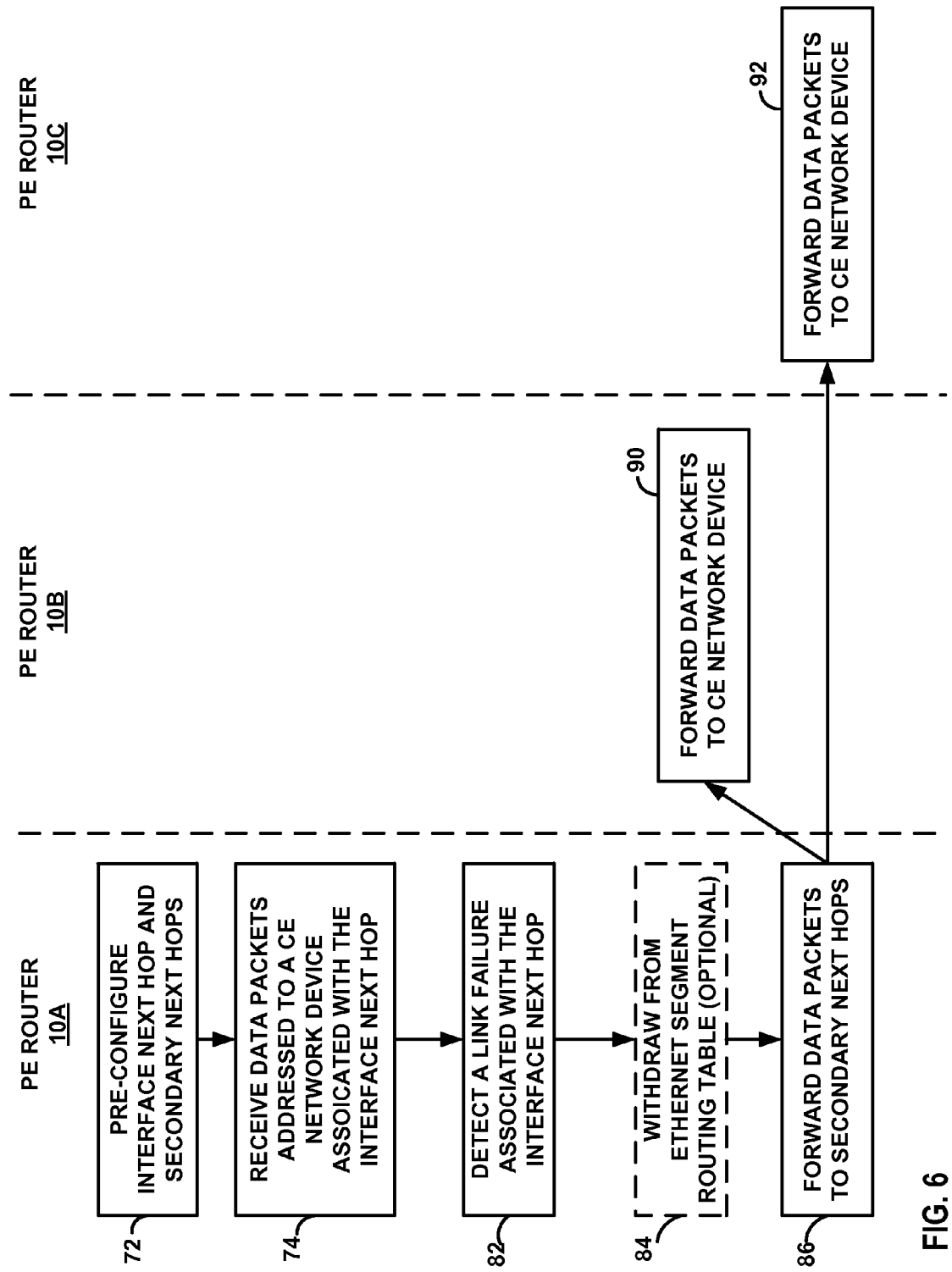
FIG. 6 is a flowchart illustrating example operations of multiple network devices, in accordance with techniques of the disclosure.

FIG. 6 is a flowchart illustrating example operations of multiple network devices for pre-configuring a next hop list and forwarding data traffic in the case of a link failure, in accordance with techniques of the disclosure. Example operations in accordance with techniques of the disclosure are illustrated for example purposes with respect to PE router 10A. However, PE routers 10B and PE router 10C may be configured in the same manner as PE router 10A.

Initially, PE router 10A may pre-configure a next hop list 62, including a primary (interface) next hop and one or more secondary (indirect) next hops (72). PE router 10A may configure the primary next hop to the local ifl to a CE router (e.g., CE router/Layer 2 switch 8B in FIG. 1). The one or more secondary next hops may be routes to one or more other PE network devices that are connected, together with PE router 10A, to CE router/Layer 2 switch 8B in a segment of a Layer 2 virtual bridge. In one example, the segment is an Ethernet segment connected to the CE network device in an all-active multi-homed EVPN topology.

In one example of the disclosure, PE router 10A may configure the interface next hop with a low weight so that all data traffic addressed to the CE network device is routed via the interface next hop when the interface next hop is available. Additionally PE router 10A may configure the one or more secondary next hops with a high weight so that data traffic is load-balanced when the interface next hop is not available.

PE router 10A may receive data packets addressed the next work device associated with the interface next hop (74). In the case the network link associated with the interface next hop is functioning, PE router 10A forwards the data to through the interface next hop. PE router 10A may be further configured to detect a link failure associated with the interface next hop (82). In this case, PE router 10A may be configured to optionally withdraw from a routing table for Ethernet segment 14 (e.g., using AD-per-ES withdrawal)

(84). In addition, PE router 10A may access next hop and list 62 forward the data packets to the one or more secondary (indirect) next hops (86). With reference to FIG. 1, PE router 10A may be configured to forward the data packets to PE router 10B and PE router 10C. PE router 10B may then forward the received data packets to the CE network device (90). Likewise, PE router 10C may forward any received data packets to the CE network device (92).

Figure 7:
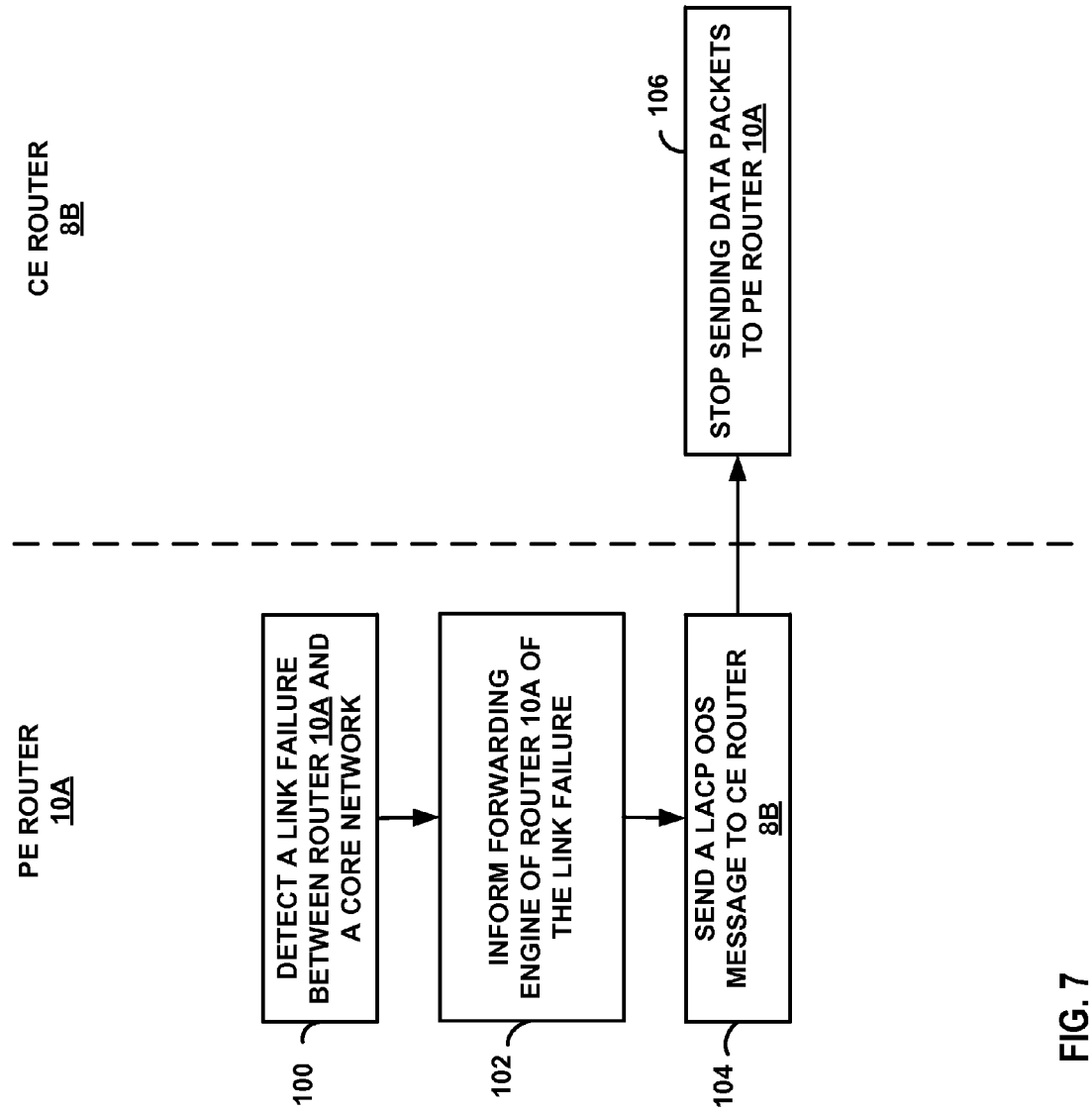
FIG. 7 is a flowchart illustrating example operations of a PE router and a CE router, in accordance with techniques of the disclosure.

FIG. 7 is a flowchart illustrating example operations of multiple network devices for messaging in the case of a link failure, in accordance with techniques of the disclosure. Example operations in accordance with techniques of the disclosure are illustrated for example purposes with respect to PE router 10A. However, PE routers 10B and PE router 10C may be configured in the same manner as PE router 10A.

PE router 10A may be configured to detect a link failure between PE router 10A and a core network (100). For example, with reference to FIG. 1, PE router 10A may detect a link failure in network link 16D. In one example of the disclosure, PE router 10A is part of a segment of a Layer 2 virtual bridge connected to a CE network device (e.g., CE router/Layer 2 switch 8B) and the core network. In a more particular example of the disclosure, the segment is an Ethernet segment connected to the CE router/Layer 2 switch 8B in an all-active multi-homed EVPN topology. In addition, PE router 10A may be part of a LAG for CE router/Layer 2 switch 8B.

In response to detecting the link failure, PE router 10A may inform a forwarding engine (e.g., forwarding engines 30) of PE router 10A of the link failure (102). Forwarding engines 30 of PE router 10A may then send an LACP OOS message to the CE router/Layer 2 switch 8B (104). The message indicates the link failure and that indicates that data packets should not be sent to the PE router 10A. CE router/Layer 2 switch 8B, in response to the LACP OOS message, may stop sending data packets to PE router 10A (106).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
   pre-configuring, at a first provider edge (PE) network device, a primary route to a customer edge (CE) network device and one or more secondary routes to the CE network device, the primary route using a first communication link between the first PE network device and the CE network device, and the one or more secondary routes using one or more other respective communication links between the first PE network device and one or more other PE network devices, wherein the first PE network device and the one or more other PE network devices are configured in an all-active mode as part of an Ethernet segment of a Layer 2 virtual bridge and the CE network device is multi-homed to the first PE network device and the one or more other PE network devices;
   receiving, at the first PE network device, data packets addressed to the CE network device;
   detecting, by the first PE network device, a link failure for the primary route; and
   forwarding, by the first PE network device, the data packets addressed to the CE network device using the one or more secondary routes in response to detecting the link failure for the primary route.

2. The method of claim 1, wherein pre-configuring the primary route and the one or more secondary routes comprises:
   configuring a next hop list, the next hop list including an interface next hop for the primary route, and one or more secondary next hops for the one or more secondary routes.

3. The method of claim 2, further comprising:
   configuring the interface next hop with a low weight in the next hop list so that all network traffic addressed to the CE network device is routed via the first communication link when the first communication link is available; and configuring the one or more secondary next hops with a high weight in the next hop list so that network traffic is load-balanced when the first communication link is not available.

4. The method of claim 2, wherein forwarding, by the first PE network device, the data packets addressed to the CE network device to the one or more secondary routes in response to detecting the link failure in the primary route comprises:
configuring the next hop list to select the one or more secondary next hops; and
responsive to receiving the data packets, forwarding the data packets using the one or more secondary next hops.

5. The method of claim 4, wherein the one or more secondary next hops are multiprotocol label switching (MPLS) next hops.

6. The method of claim 1, further comprising:
withdrawing, by the first PE network device, from a routing table for the Ethernet segment in response to detecting the link failure.

7. The method of claim 1, wherein the data packets are known unicast traffic.

8. The method of claim 1, further comprising:
detecting, by the first PE network device, a link failure between the first PE network device and another PE network device providing access to a core network; and
sending, by the first PE network device in response to detecting the link failure between the first PE network device and the core network, a message to the CE network device that indicates the link failure and that indicates that the data packets should not be sent to the first PE network device.

9. The method of claim 8, wherein the Ethernet segment is connected to the CE network device in an all-active multi-homed Ethernet virtual private network (EVPN) topology.

10. The method of claim 9, wherein the first PE network device is part of a link aggregation group (LAG) with the one or more other PE network devices.

11. The method of claim 10, wherein sending the message comprises sending a link aggregation control protocol (LACP) out-of-service (OOS) message.

12. A network device, wherein the network device is a first provider edge (PE) network device, comprising:
a forwarding engine configured to:
pre-configure a primary route to a customer edge (CE) network device and one or more secondary routes to the CE network device, the primary route using a first communication link between the first PE network device and the CE network device, and the one or more secondary routes using one or more other respective communication links between the first PE network device and one or more other PE network devices, wherein the first PE network device and the one or more other PE network devices are configured in an all-active mode as part of an Ethernet segment of a Layer 2 virtual bridge and the CE network device is multi-homed to the first PE network device and the one or more other PE network devices;
receive data packets addressed to the CE network device, and
forward the data packets addressed to the CE network device using the one or more secondary routes in response to detecting the link failure for the primary route; and a routing engine configured to detect the link failure for the primary route.

13. The network device of claim 12, wherein the forwarding engine is further configured to configure a next hop list, the next hop list including an interface next hop for the primary route, and one or more secondary next hops for the one or more secondary routes.

14. The network device of claim 13, wherein the forwarding engine is further configured to:
configure the interface next hop with a low weight in the next hop list so that all network traffic addressed to the CE network device is routed via the first communication link when the first communication link is available; and
configure the one or more secondary next hops with a high weight in the next hop list so that network traffic is load-balanced when the first communication link is not available.

15. The network device of claim 13, wherein the forwarding engine is further configured to:
configure the next hop list to select the one or more secondary next hops; and
responsive to receiving the data packets, forward the data packets using the one or more secondary next hops.

16. The network device of claim 15, wherein the one or more secondary next hops are multiprotocol label switching (MPLS) next hops.

17. The network device of claim 12, wherein the routing engine is further configured to withdraw from a routing table for the Ethernet segment in response to detecting the link failure.

18. The network device of claim 12, wherein the data packets are known unicast traffic.

19. The network device of claim 12, further comprising:
a routing engine configured to detect a link failure between the first PE network device and another PE network device providing access to a core network, and
wherein the forwarding engine is further configured to send, in response to the routing engine detecting the link failure between the first PE network device and the core network, a message to the CE network device that indicates the link failure and that indicates that the data packets should not be sent to the first PE network device.

20. The network device of claim 19, wherein the Ethernet segment is connected to the CE network device in an all-active multi-homed Ethernet virtual private network (EVPN) topology.

21. The network device of claim 20, wherein the first PE network device is part of a link aggregation group (LAG) with the one or more other PE network devices.

22. The network device of claim 21, wherein sending the message comprises sending a link aggregation control protocol (LACP) out-of-service (OOS) message.

23. A network system comprising:
a plurality of provider edge (PE) network devices connected to a customer edge (CE) network device and configured in an Ethernet segment of a Layer 2 virtual bridge, wherein each of the plurality of PE network devices are configured to:
pre-configure a primary route to the CE network device and one or more secondary routes to the CE network device, the primary route being a first communication link between a respective one of the plurality of PE network devices and the CE network device, and the one or more secondary routes being one or more other respective communication links between the respective one of the plurality of PE network devices and others of the plurality of PE network devices, wherein the first PE network device and the one or more other PE network devices are configured in an all-active mode as part of the Ethernet segment of the Layer 2 virtual bridge and the CE network device is multi-homed to the first PE network device and the one or more other PE network devices, detect a link failure for the primary route, receive data packets addressed to the CE network device, and forward the data packets addressed to the CE network device using the one or more secondary routes in response to a detection of a link failure for the primary route.

24. The network system of claim 23, wherein the each of the plurality of PE network devices is further configured to withdraw from a routing table for the Ethernet segment in response to detecting the link failure.

25. The network system of claim 23, wherein the data packets are known unicast traffic.

26. The network system of claim 23, wherein
the plurality of PE network devices is connected to the CE network device and a core network, and wherein each of the plurality of PE network devices are configured to:
detect a link failure between a respective one of the plurality of PE network devices and another PE network device providing access to the core network; and
send, in response detecting the link failure, a message to the CE network device that indicates the link failure and that indicates that the data packets should not be sent to the respective one of the plurality of PE network devices.

27. The network system of claim 26, wherein the Ethernet segment is connected to the CE network device in an all-active multi-homed Ethernet virtual private network (EVPN) topology.

28. The network system of claim 27, wherein the plurality of PE network devices are part of a link aggregation group (LAG).

29. The network system of claim 28, wherein sending the message comprises sending a link aggregation control protocol (LACP) out-of-service (OOS) message.

* * * * *